(12) United States Patent
Chen

(10) Patent No.: US 11,433,564 B1
(45) Date of Patent: Sep. 6, 2022

(54) FOOD CUTTER

(71) Applicant: SHUANGMA PLASTIC MANUFACTURING INC., Taizhou (CN)

(72) Inventor: Cuihong Chen, Taizhou (CN)

( * ) Notice: Subject to any disclaimer, the term of this patent is extended or adjusted under 35 U.S.C. 154(b) by 0 days.

(21) Appl. No.: 17/458,733

(22) Filed: Aug. 27, 2021

(30) Foreign Application Priority Data

May 20, 2021 (CN) .......................... 202121096065.2

(51) Int. Cl.
| | |
|---|---|
| *B26D 9/00* | (2006.01) |
| *B26D 1/06* | (2006.01) |
| *B26D 5/10* | (2006.01) |
| *B26D 3/10* | (2006.01) |
| *B26D 3/28* | (2006.01) |

(52) U.S. Cl.
CPC ............... *B26D 3/10* (2013.01); *B26D 3/283* (2013.01)

(58) Field of Classification Search
CPC .... B26D 9/00; B26D 2007/0018; B26D 5/10; B26D 2210/02; B26D 1/06; B26D 2003/288; B26D 3/26; B26D 3/283; B26D 2003/286; B26D 2003/287; B26D 2003/285; B26D 1/0006; B26D 1/18; B26D 7/0616; A47J 47/00; A47J 43/25; Y10T 83/889; Y10T 83/0505; Y10T 83/9454; Y10T 83/222; Y10T 83/9498; Y10T 83/732; Y10S 83/932
USPC ...... 30/233, 278, 279.6, 280, 283, 286, 289, 30/291; 83/648, 436.7, 852, 858, 932, 83/440, 856, 355, 729, 698.11, 440.2, 83/699, 435.11, 425.3; 241/95, 273.1, 241/169, 169.1, 168, 273.2, 273.4; 99/537
See application file for complete search history.

(56) References Cited

U.S. PATENT DOCUMENTS

| | | | |
|---|---|---|---|
| 11,072,083 B2 | 7/2021 | Simard | |
| 2010/0180778 A1* | 7/2010 | Walker | B26D 3/28 |
| | | | 83/167 |
| 2011/0041659 A1* | 2/2011 | Williams | B26D 1/10 |
| | | | 83/13 |
| 2014/0360331 A1 | 12/2014 | Yasuda et al. | |
| 2016/0257013 A1* | 9/2016 | Exley | B26D 3/11 |
| 2017/0312929 A1 | 11/2017 | Zhu et al. | |
| 2020/0047368 A1* | 2/2020 | Jin | B26D 9/00 |
| 2020/0070377 A1* | 3/2020 | Jaureguibeitia Olalde | |
| | | | B26D 1/18 |

FOREIGN PATENT DOCUMENTS

| | | |
|---|---|---|
| CN | 105619473 A | 6/2016 |
| CN | 206445855 U | 8/2017 |

* cited by examiner

*Primary Examiner* — Ghassem Alie

(57) ABSTRACT

A food cutter induces an operating frame, a push-pull mechanism and an elastic connecting piece. A mounting cavity and a feeding hole are formed in the operating frame; and the push-pull mechanism is mounted in the mounting cavity and connected with the operating frame in a sliding manner. The push-pull mechanism includes a push-pull rack, a stationary knife and a movable knife; the stationary knife is fixedly mounted on the push-pull rack; the movable knife is detachably mounted on the push-pull rack and positioned below the stationary knife; and a discharging hole is formed in the push-pull rack and communicated with the feeding hole and the mounting cavity. One end of the elastic connecting piece is fixedly connected with the operating frame, and the other end is fixedly connected with the push-pull rack.

9 Claims, 13 Drawing Sheets

FOOD CUTTER

CROSS REFERENCE TO RELATED APPLICATIONS

This application claims foreign priority of Chinese Patent Application No. 202121096065.2, filed on May 20, 2021 in the China National Intellectual Property Administration, the disclosures of all of which are hereby incorporated by reference.

TECHNICAL FIELD

The disclosure relates to a food cutter.

BACKGROUND OF THE DISCLOSURE

During daily cooking, food is often cut into definite shapes, such as flakes or chip, and then fried or stirred. The food can be directly cut by a manual cutter and may also be cut by a food cutter in the market. However, the existing food cutter may have a too simple structure so that a cutter is simply mounted on a board and thus, the food cutter is inconvenient to operate and few in functions; or the existing food cutter is too complicated in structure, troublesome in operation, inconvenient to clean and high in cost. Therefore, a food cutter that is simple and reasonable in structure, convenient in operation and full in functions needs to be designed.

SUMMARY OF PRESENT DISCLOSURE

To solve problems existing in the prior art, the disclosure provides a food cutter. Through reasonable and improved design of the cutter structure, the food cutter is convenient in operation, simple and reasonable in structure and convenient in cleaning.

To achieve the above purpose, technical solutions of the disclosure are as follows: the food cutter includes:

an operating frame, wherein a mounting cavity and a feeding hole are formed in the operating frame;

a push-pull mechanism, wherein the push-pull mechanism is mounted in the mounting cavity and connected with the operating frame in a sliding manner; the push-pull mechanism includes a push-pull rack, a stationary knife and a movable knife; the stationary knife is fixedly mounted on the push-pull rack; the movable knife is detachably mounted on the push-pull rack and positioned below the stationary knife; and a discharging hole is formed in the push-pull rack and communicated with the feeding hole and the mounting cavity;

chutes formed in side walls of the operating frame, wherein sliding rails are arranged on both sides of the push-pull rack, the sliding rails are matched with the chutes, and the chutes include a first chute and a second chute; and an elastic connecting piece, wherein one end of the elastic connecting piece is fixedly connected with the operating frame; and the other end of the elastic connecting piece is fixedly connected with the push-pull rack.

In one embodiment of the disclosure, the chutes are communicated with the mounting cavity.

In one embodiment of the disclosure, sliding rails are arranged on both sides of the push-pull rack and matched with the chutes.

In one embodiment of the disclosure, a movable knife mounting part is arranged on the push-pull rack; the movable knife mounting part is positioned below the stationary knife; and the movable knife is detachably mounted on the movable knife mounting part. The movable knife mounting part is a movable knife mounting slot, and the movable knife is inserted and clamped in the movable knife mounting slot. A thickness of the movable knife is smaller than a depth of the movable knife mounting slot.

In one embodiment of the disclosure, the movable knife includes a slice cutter, a chip cutter and a shred cutter; one side of each of the slice cutter, the chip cutter and the shred cutter facing the feeding hole is a cutting surface; the cutting surface of the slice cutter is a smooth surface; and cutter teeth are arranged on the cutting surfaces of the chip cutter and the shred cutter.

In one embodiment of the disclosure, the height of the cutter teeth is larger than the height of the feeding hole.

In one embodiment of the disclosure, a push-pull groove is formed in the inner wall of the mounting cavity and matched with the cutter teeth. By virtue of the push-pull groove, the cutter teeth may conveniently travel.

In one embodiment of the disclosure, clearance grooves are formed in the side walls of the operating frame; a knife handle is arranged on the movable knife; and the clearance grooves are matched with the knife handle. By virtue of the clearance grooves, the knife handle may conveniently slip.

In one embodiment of the disclosure, the elastic connecting piece is a tension spring and further includes a sealing cover; the sealing cover is arranged on the elastic connecting piece; and the sealing cover is fixedly connected with the operating frame.

In one embodiment of the disclosure, the food cutter further includes a foot stand which is hinged with the operating frame.

The technical solution has beneficial effects as follows:

In the disclosure, the cutter is divided into the stationary knife and the movable knife, so that food cutting requirements for various shapes like flakes or chips may be met. Meanwhile, according to arrangement of the detachable movable knife, the cutter is convenient to be cleaned. Push-pull cutting and cutter resetting can be realized by virtue of elastic connection between the operating frame and the push-pull mechanism. The push-pull rack is mounted in the mounting cavity of the operating frame and limited and guided by the chutes, so that the push-pull structure is stationary in motion; the cutting process is smooth; and the cut products have excellent consistency.

Figure 1:
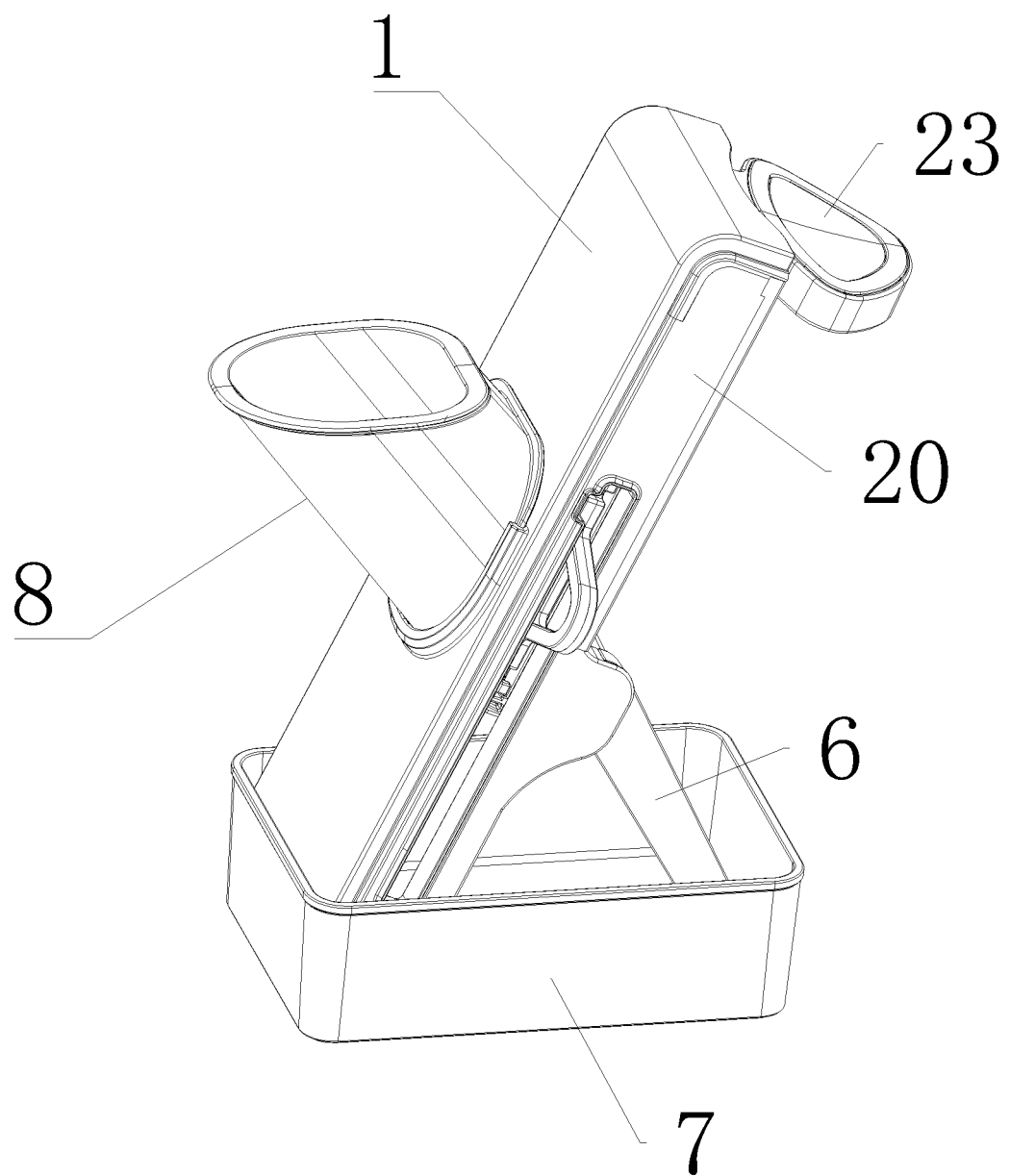
FIG. 1 is a structural schematic diagram of one embodiment in the disclosure.

REFERENCE SYMBOLS operating frame 1; mounting cavity 10; feeding hole 11; first chute 101; second chute 102; clearance groove 103;

push-pull mechanism 2; push-pull rack 20; stationary knife 21; first sliding rail 201; second sliding rail 202; movable knife mounting slot 200; discharging hole 22; push-pull handle 23; retaining groove 24;

slice cutter 31; chip cutter 32; shred cutter 33; cutting surface 300; knife handle 301; cutter tooth 333; tension spring 4; sealing cover 5; foot stand 6; storage box 7; feed hopper 8.

DETAILED DESCRIPTION OF PREFERRED EMBODIMENTS

The disclosure will be further described below in combination with the embodiments and FIGS. 1-16.

A food cutter includes an operating frame 1, a push-pull mechanism 2 and an elastic connecting piece. A mounting cavity 10 and a feeding hole 11 are formed in the operating frame 1; and the push-pull mechanism 2 is mounted in the mounting cavity 10 and connected with the operating frame 1 in a sliding manner. The push-pull mechanism 2 includes a push-pull rack 20, a stationary knife 21 and a movable knife; the stationary knife 21 is fixedly mounted on the push-pull rack 20; the movable knife is detachably mounted on the push-pull rack 20 and positioned below the stationary knife 21; and a discharging hole 22 is formed in the push-pull rack 20 and communicated with the feeding hole 11 and the mounting cavity 10. One end of the elastic connecting piece is fixedly connected with the operating frame 1; and the other end of the elastic connecting piece is fixedly connected with the push-pull rack 20. Food positioned at the feeding hole 11 is cut by pushing and pulling the push-pull rack 20.

Figure 6:
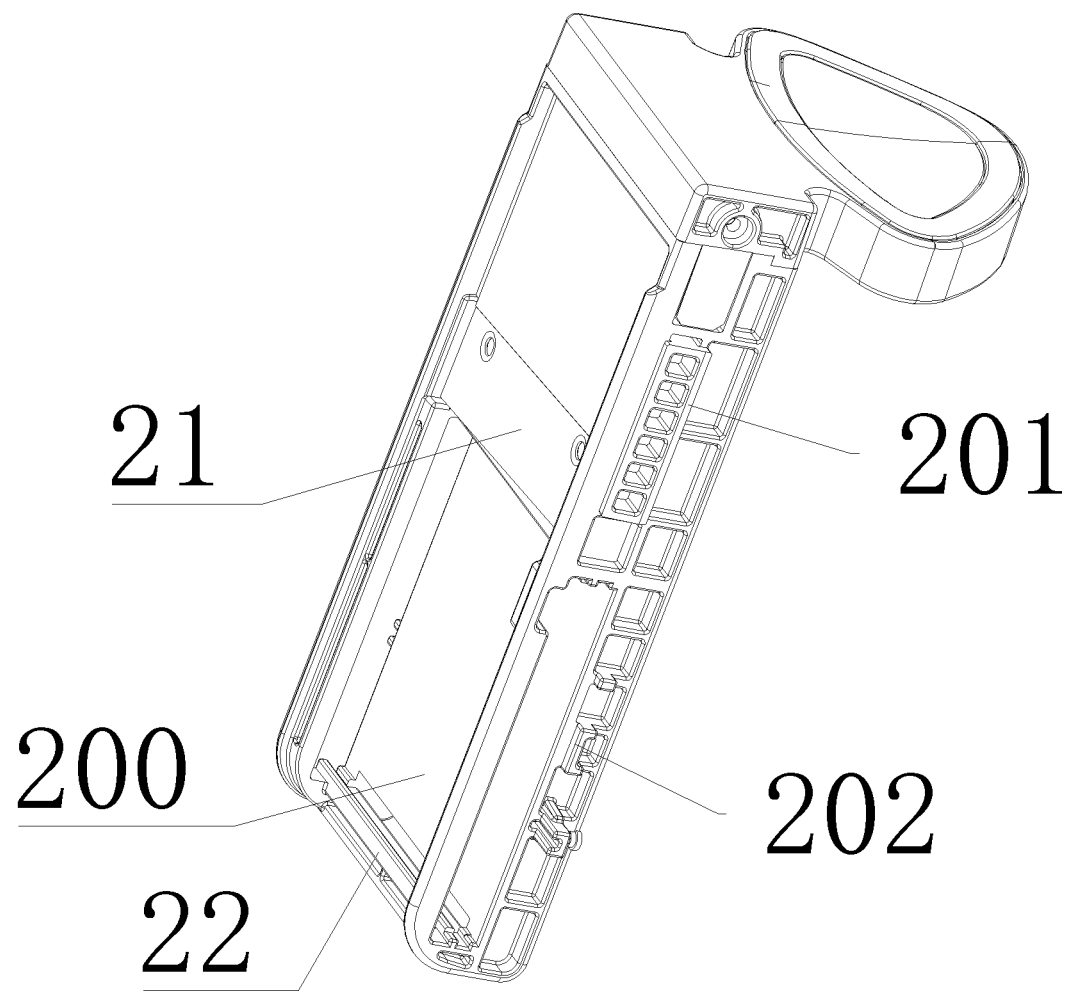
FIG. 6 is a local structural schematic diagram of FIG. 5 in the disclosure.
Figure 7:
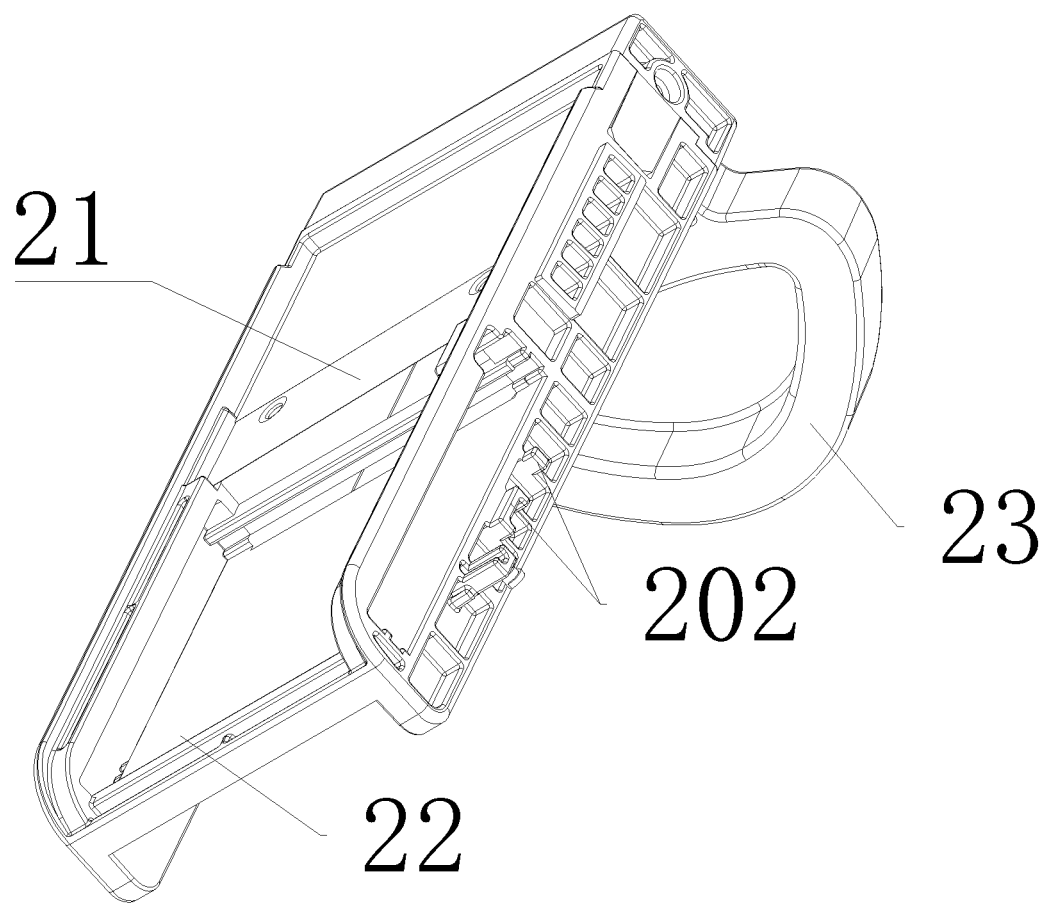
FIG. 7 is a structural schematic diagram of another angle of FIG. 6 in the disclosure.
Figure 8:
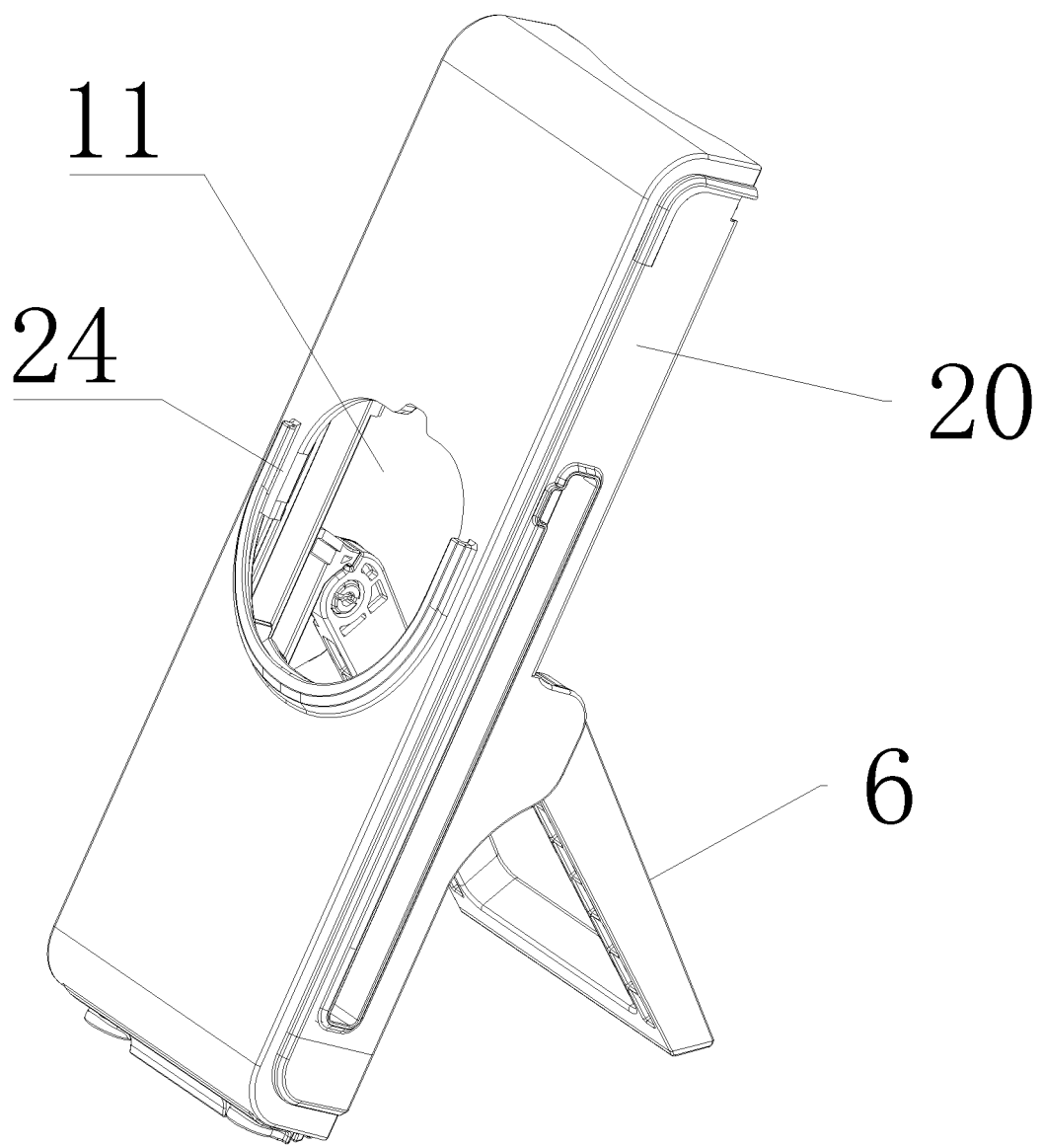
FIG. 8 is a structural schematic diagram of an operating frame in one embodiment of the disclosure.
Figure 9:
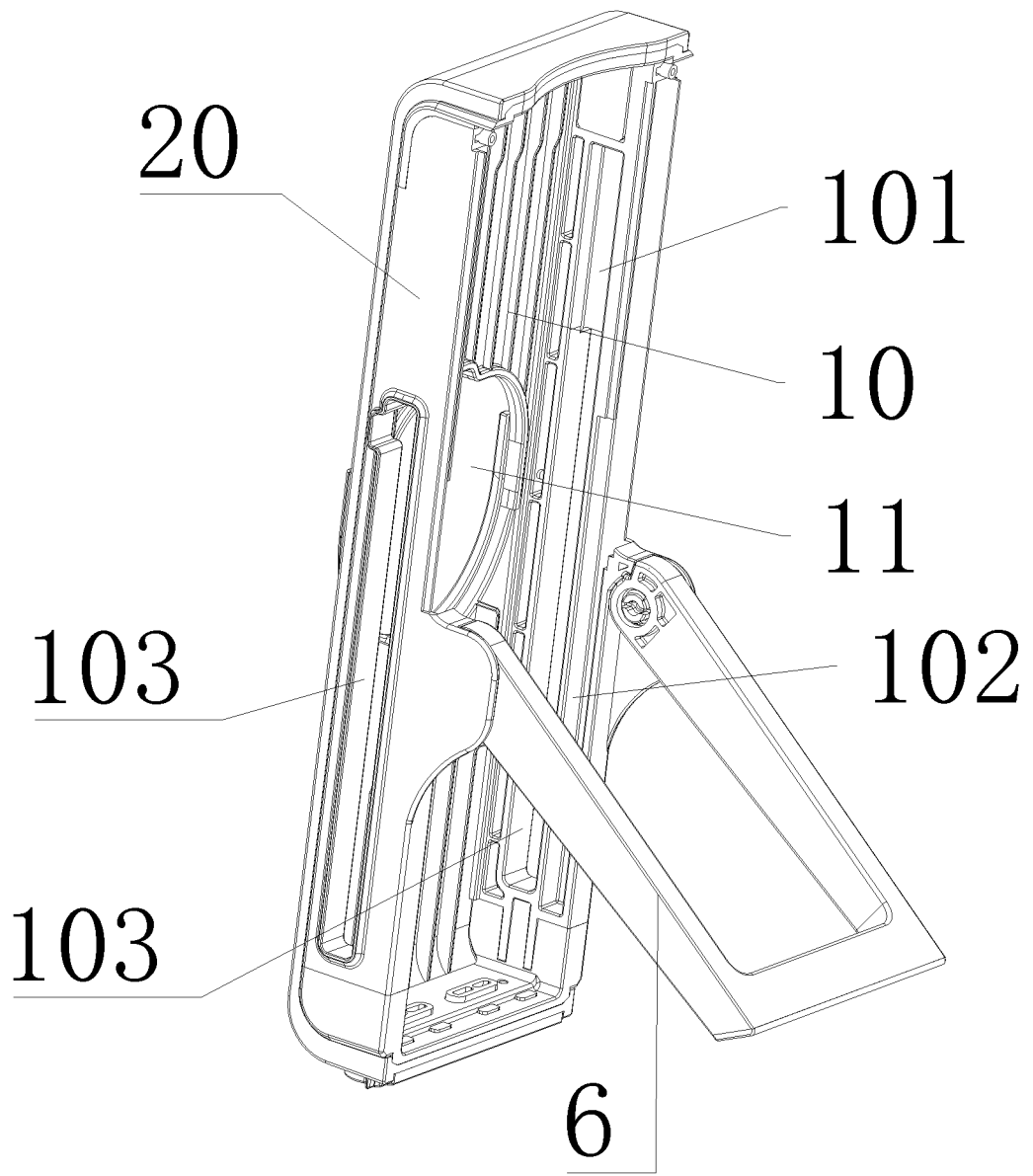
FIG. 9 is a structural schematic diagram of another angle of FIG. 8 in the disclosure.
Figure 10:
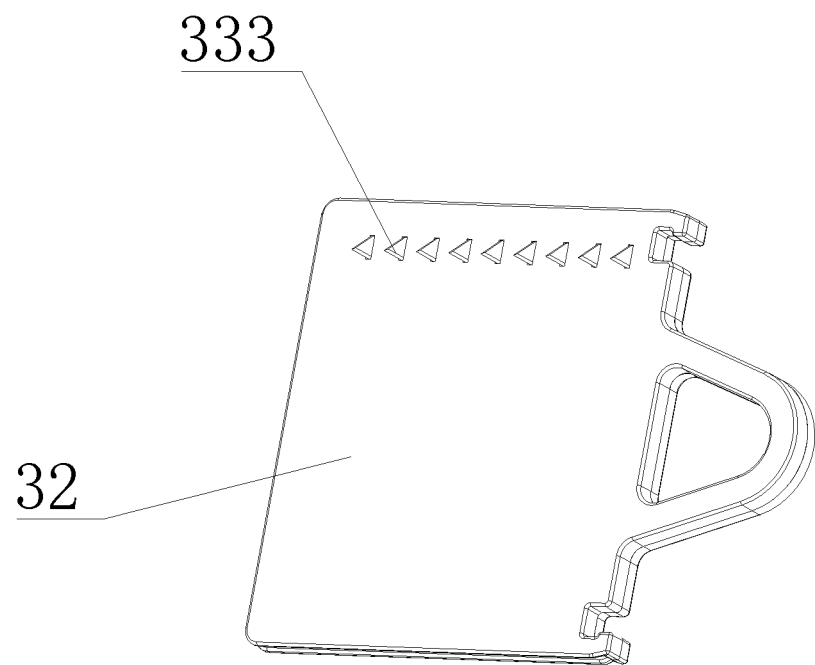
FIG. 10 is a structural schematic diagram of a chip cutter in one embodiment of the disclosure.
Figure 11:
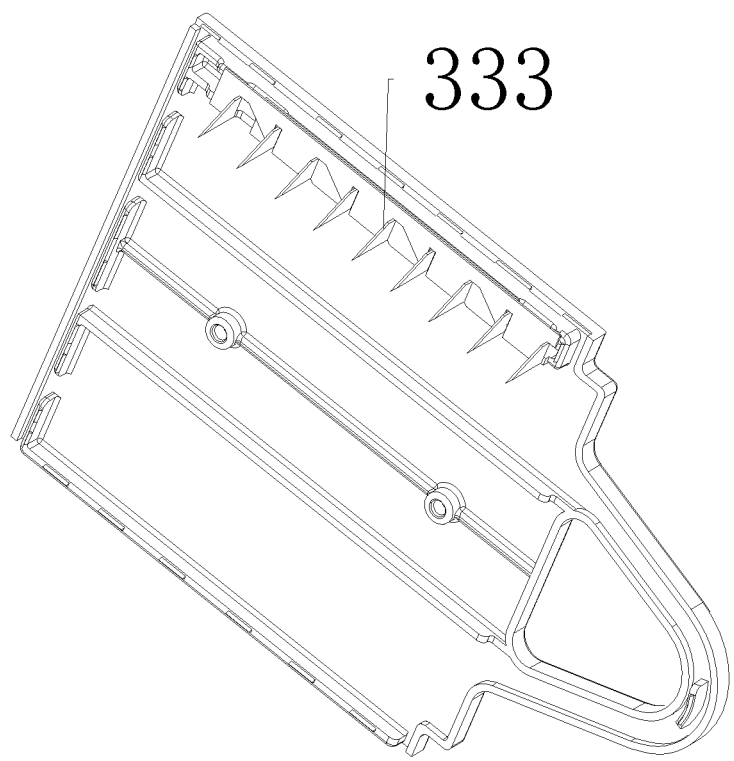
FIG. 11 is a partial structural schematic diagram of a chip cutter in one embodiment of the disclosure.
Figure 12:
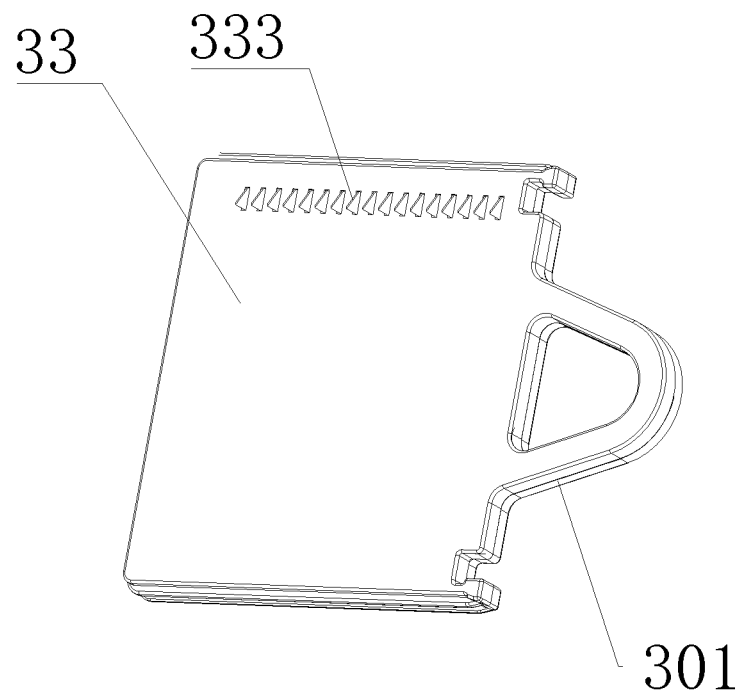
FIG. 12 is a structural schematic diagram of a shred cutter in one embodiment of the disclosure.
Figure 13:
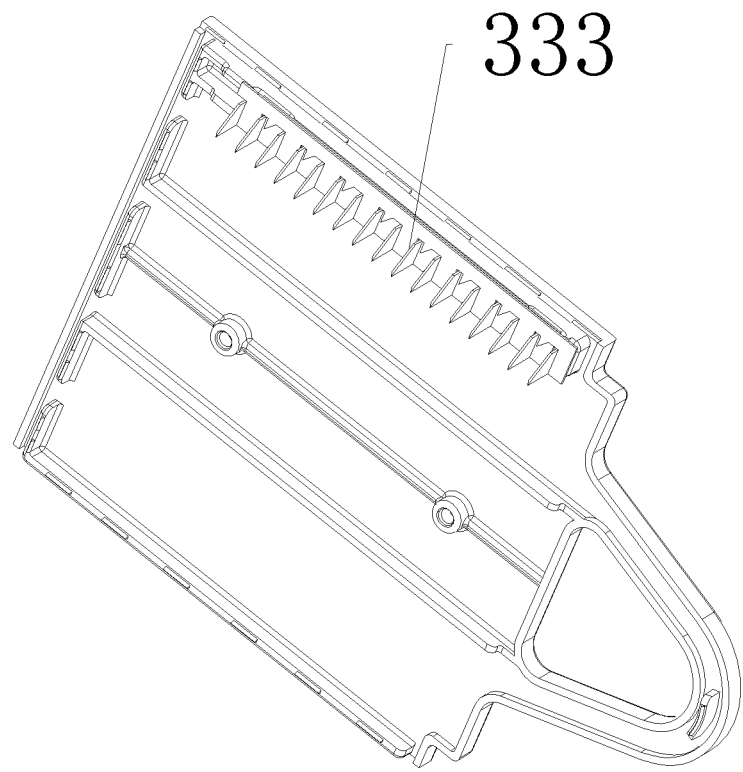
FIG. 13 is a partial structural schematic diagram of a shred cutter in one embodiment of the disclosure.
Figure 14:
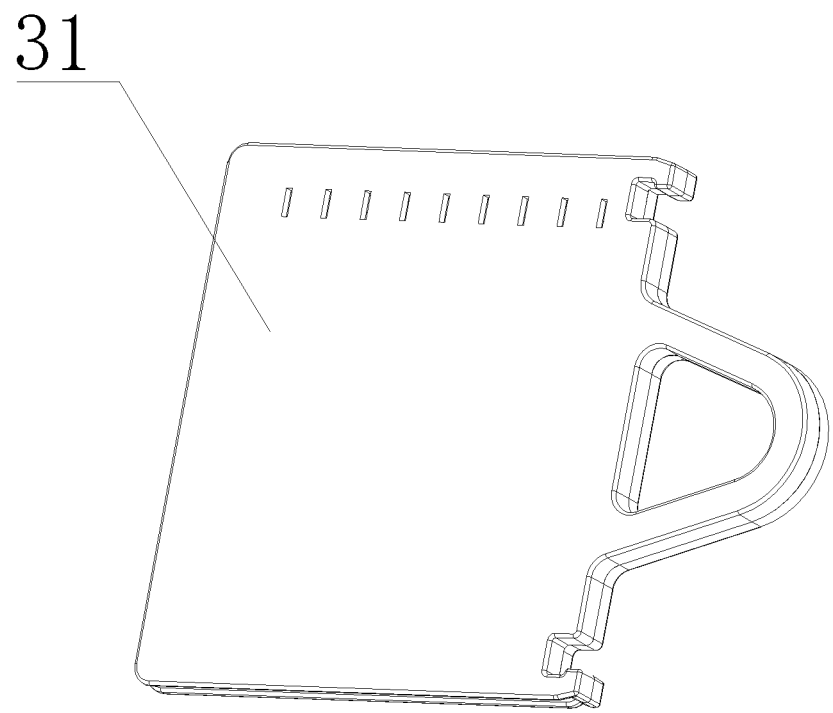
FIG. 14 is a structural schematic diagram of a slice cutter in one embodiment of the disclosure.
Figure 15:
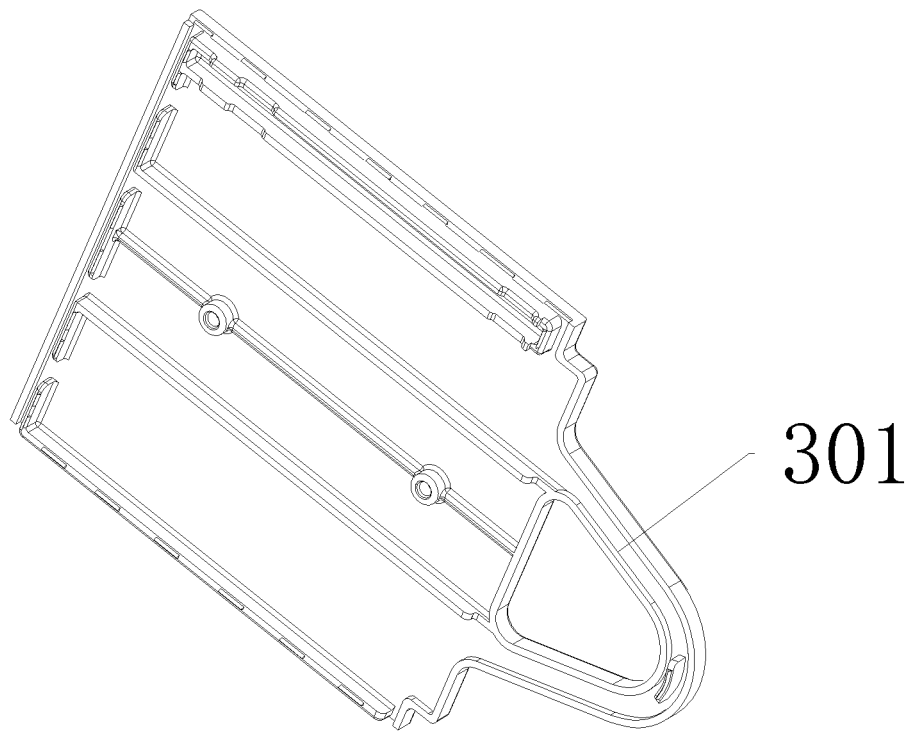
FIG. 15 is a partial structural schematic diagram of a slice cutter in one embodiment of the disclosure.
Figure 16:
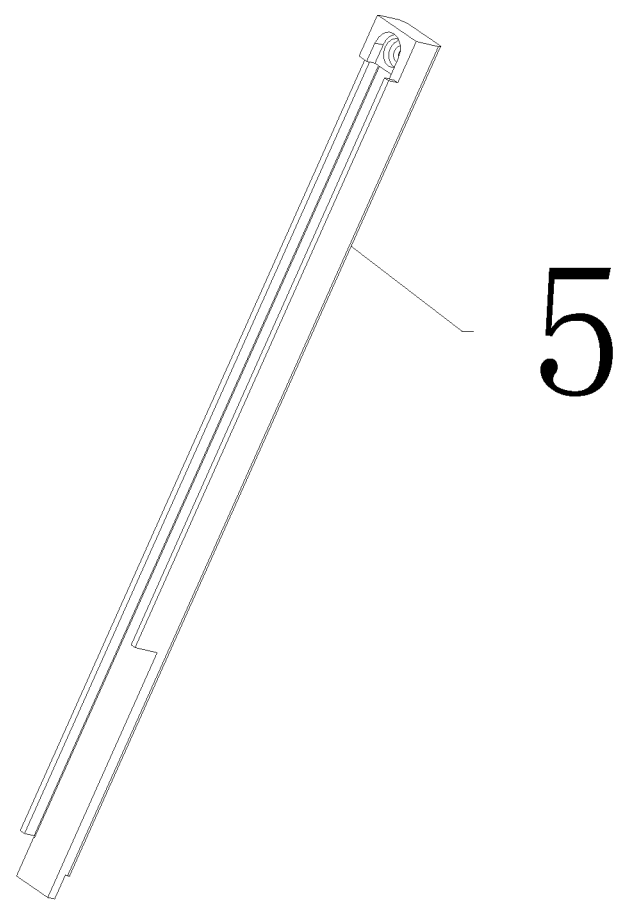
FIG. 16 is a structural schematic diagram of a sealing cover in one embodiment of the disclosure.

Chutes are formed in the inner side walls of the operating frame 1 and communicated with the mounting cavity 10. Correspondingly, sliding rails are arranged on both sides of the push-pull rack 20; and the sliding rails are matched with the chutes. The chutes include a first chute 101 and a second chute 102; and the sliding rails include a first sliding rail 201 and a second sliding rail 202. The first chute 101 is matched with the first sliding rail 201; and the second chute 102 is matched with the second sliding rail 202, so as to slide the push-pull rack 20 relative to the operating frame 10. As shown in FIGS. 6 and 7, both the first sliding rail 201 and the second sliding rail 202 protrude outwards. The first sliding rail 201 and the second sliding rail 202 are respectively symmetrically arranged on both sides of the push-pull rack 20; the first sliding rail 201 and the second sliding rail 202 are parallel but non-collinear to each other; the first sliding rail 201 is positioned on the upper part of a side face of the push-pull rack 20; and the second sliding rail 202 is positioned on the lower part of the side face of the push-pull rack 20. In the present embodiment, the first sliding rail 201 is a continuous lug, and the second sliding rail 202 is a discontinuous lug. Thus, weight may be reduced; and a smooth sliding effect can be achieved.

A movable knife mounting part is arranged on the push-pull rack 20; the movable knife mounting part is positioned below the stationary knife 21; and the movable knife is detachably mounted on the movable knife mounting part. The movable knife mounting part is a movable knife mounting slot 200, and the movable knife is inserted and clamped in the movable knife mounting slot 200. A thickness of the movable knife is smaller than a depth of the movable knife mounting slot 200, so that the cut sliced or shredded food drops from the discharging hole 22. The stationary knife 21 is transversely mounted above the movable knife mounting slot 200. The movable knife includes a slice cutter 31, a chip cutter 32 and a shred cutter 33; one side of each of the slice cutter 31, the chip cutter 32 and the shred cutter 33 facing the feeding hole 11 is a cutting surface 300; the cutting surface 300 of the slice cutter 31 is a smooth surface; and cutter teeth 333 are arranged on the cutting surfaces 300 of the chip cutter 32 and the shred cutter 33.

When the food needs to be sliced, the slice cutter 31 is inserted at the movable knife mounting slot 200; no cutter tooth 333 exists on the slice cutter 31; the food is sliced through the stationary knife 21 by pushing and pulling a cutting mechanism; and the cut slices slide down from the slice cutter 31 to reach the bottom of the push-pull rack 20 and then slide out of the discharging hole 22. When the food needs to be chopped or shredded, the chip cutter 32 or the shred cutter 33 is similarly inserted at the movable knife mounting slot 200; the cutting mechanism is pushed and pulled; and then the chips or shreds slide down from the chip cutter 32 or the shred cutter 33 to reach the bottom of the push-pull rack 20 and then slide out of the discharging hole 22. Sizes and spacing of the cutter teeth 333 on the chip cutter 32 and the shred cutter 33 may be adjusted according to needs, so that the cut chips and shreds meet the shape requirements.

A knife handle 301 is arranged on the movable knife, so that the movable knife is conveniently withdrawn during installation. Correspondingly, clearance grooves 103 are formed in the side walls of the operating frame 1; and by virtue of the clearance grooves 103, the knife handle 301 may smoothly slide. The clearance grooves 103 are formed in both sides of the operating frame 1. On one hand, the movable knife is conveniently mounted; and on the other hand, weight in the product is reduced. A push-pull groove is formed in the inner wall of the mounting cavity 10 and matched with the cutter teeth 333. Through the push-pull groove, a clearance forming effect is achieved when the travel of the cutter teeth is blocked.

Figure 2:
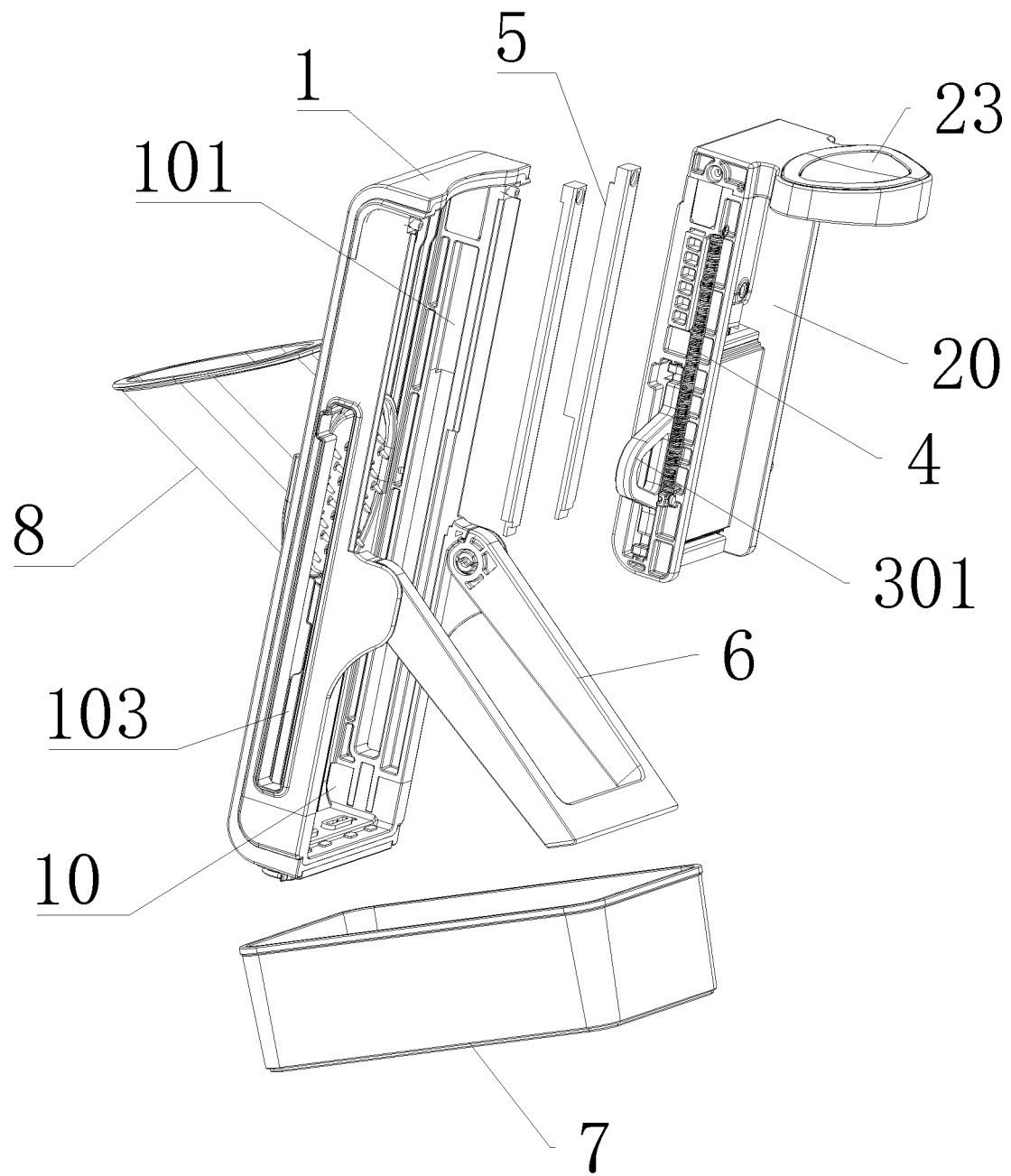
FIG. 2 is an explosive view of FIG. 1 in the disclosure.
Figure 3:
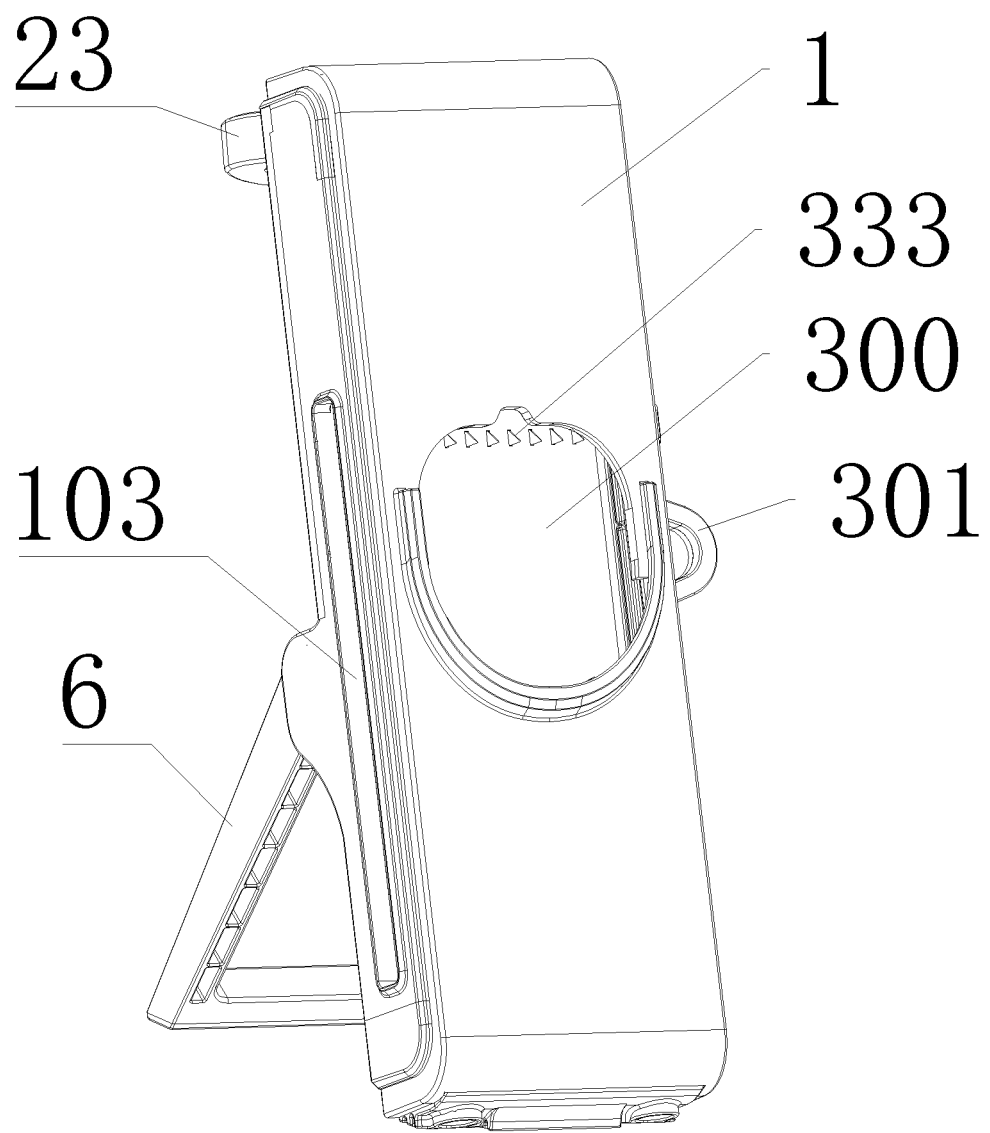
FIG. 3 is a structural schematic diagram of one embodiment in the disclosure.
Figure 4:
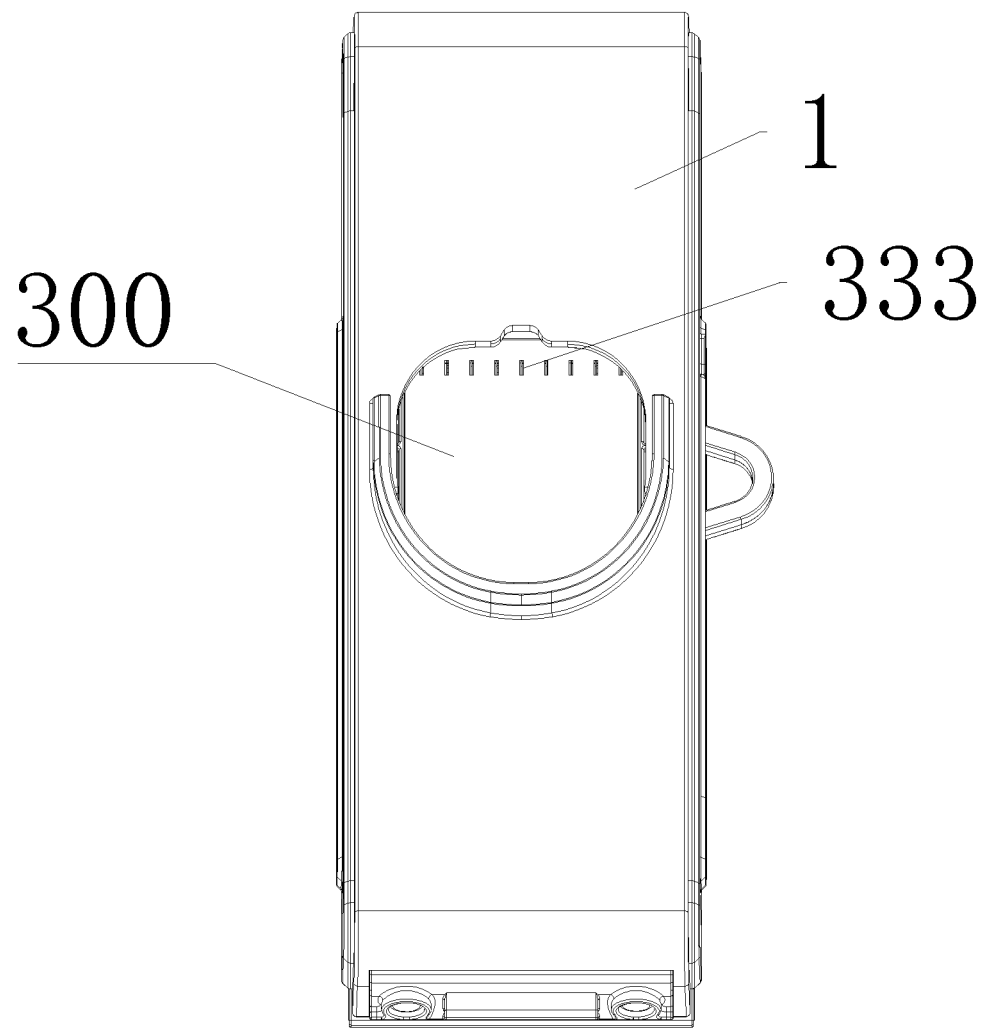
FIG. 4 is a front view of FIG. 3 in the disclosure.
Figure 5:
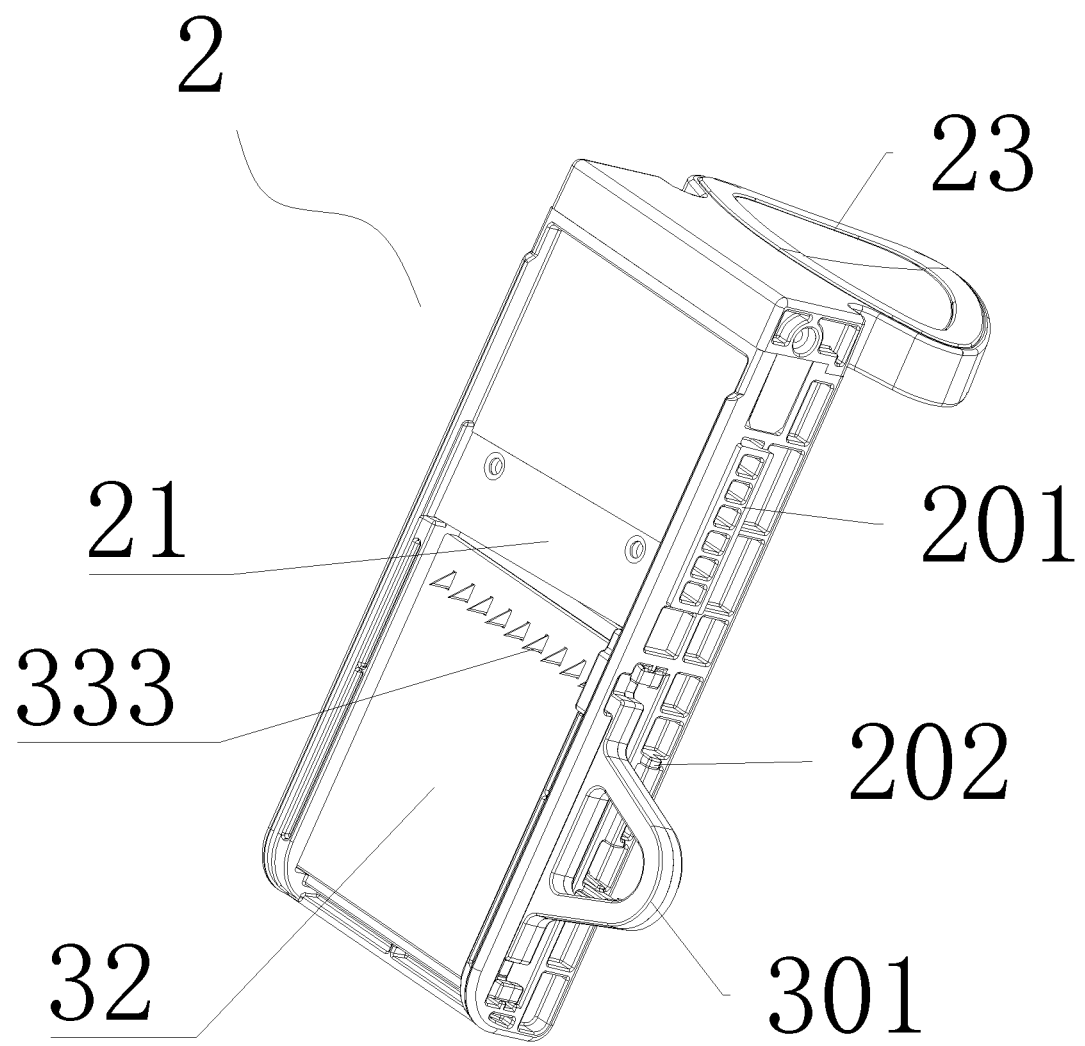
FIG. 5 is a structural schematic diagram of a push-pull mechanism in one embodiment of the disclosure.

The elastic connecting piece is a tension spring 4. One end of the tension spring 4 is fixed at the tail end of the second guide rail; and the other end of the tension spring 4 is fixed on the upper part of the operating frame 1, as shown in FIG. 2. When the push-pull rack 20 is pushed downwards, the tension spring 4 is stretched; when the push-pull rack 20 is pushed to the bottom of the operating frame 1, a cutting action is completed; then the tension spring 4 resets to drive the push-pull rack 20 to upwards rebound to an original position; the top of the operating frame 1 achieves a certain limiting effect on the push-pull rack 20; and under the effect of the tension spring 4, the push-pull rack 20 rebounds to the original position. During upward resetting of the push-pull rack 20, the cut food slices or food shreds or food chips will drop from the discharging hole 22.

Further, a mounting groove for containing the tension spring 4 is formed in the operating frame 1; a sealing cover 5 is mounted on the mounting groove and covers the tension spring 4; and the sealing cover 5 is fixedly connected with the operating frame 1.

Further, a push-pull handle 23 is arranged on the push-pull rack 20; and the handle and the push-pull rack 20 are fixedly connected, and are integrally molded in the present embodiment. By virtue of the push-pull handle 23, the push-pull rack 20 is downwards pressed by an operator conveniently.

Further, the food cutter further includes a foot stand 6 and a storage box 7. The foot stand 6 is hinged with the operating frame 1. During food cutting, the bottom of the operating frame 1 is abutted against the front side of the storage box 7. Meanwhile, the foot stand 6 is abutted against the rear side of the storage box 7. The storage box 7 achieves an effect of fixing the push-pull rack 20. Thus, cutting is more convenient; and the cut food directly drops into the storage box 7, thereby avoiding a messy operating space.

Further, the food cutter further includes a feed hopper 8. The feed hopper 8 is mounted at the feeding hole 11 and is used for placing and fixing the food so as to provide convenience for smooth cutting. A retaining groove is formed in the feeding hole 11 of the operating frame 1; and the feed hopper 8 is inserted and clamped in the retaining groove 24. The retaining groove 24 is a groove of which the upper end is opened; and the feed hopper 8 is inserted from the opened direction. The height of the cutter teeth 333 is larger than the height of the feed hopper 8, so that the food at the feeding hole 11 is completely cut.

In the disclosure, the food positioned at the feeding hole 11 is cut by pushing and pulling the push-pull rack 20; through the arrangement of a cutting tool, the food may be cut into many shapes; and the food cutter is simple and convenient in cutting process and convenient for product cleaning.

The above specific embodiments are merely used for explaining and describing the disclosure, rather than limiting the disclosure. Any changes and replacements made to the disclosure in the protection scope of the concept and claims of the disclosure without making creative labor shall fall within the protection scope of the disclosure.

I claim:

1. A food cutter, comprising:
    an operating frame, wherein a mounting cavity and a feeding hole are formed in the operating frame;
    a push-pull mechanism, wherein the push-pull mechanism is mounted in the mounting cavity and connected with the operating frame in a sliding manner; the push-pull mechanism comprises a push-pull rack, a stationary knife and a movable knife; the stationary knife is fixedly mounted on the push-pull rack; the movable knife is detachably mounted on the push-pull rack and positioned below the stationary knife; and a discharging hole is formed in the push-pull rack and communicated with the feeding hole and the mounting cavity;
    chutes formed in side walls of the operating frame, wherein sliding rails are arranged on both sides of the push-pull rack, the sliding rails are matched with the chutes, and the chutes comprise a first chute and a second chute; each one of the side walls of the operating frame has the first chute and the second chute; sliding rails are arranged on both sides of the push-pull rack and matched with the chutes; the sliding rails comprise a first sliding rail and a second rail; the first sliding rail and the second sliding rail are respectively symmetrically arranged on both sides of the push-pull rack; the first sliding rail and the second sliding rail are parallel but non-collinear to each other; the first sliding rail is a continuous lug, and the second sliding rail is a discontinuous lug; and
    an elastic connecting piece, wherein one end of the elastic connecting piece is fixedly connected with the operating frame, and the other end of the elastic connecting piece is fixedly connected with the push-pull rack.

2. The food cutter according to claim 1, wherein the chutes are communicated with the mounting cavity.

3. The food cutter according to claim 1, wherein a movable knife mounting part is arranged on the push-pull rack; the movable knife mounting part is positioned below the stationary knife; and the movable knife is detachably mounted on the movable knife mounting part.

4. The food cutter according to claim 1, wherein the movable knife comprises a slice cutter, a chip cutter and a shred cutter; one side of each of the slice cutter, the chip cutter and the shred cutter facing the feeding hole is a cutting surface; the cutting surface of the slice cutter is a smooth surface; and cutter teeth are arranged on the cutting surfaces of the chip cutter and the shred cutter.

5. The food cutter according to claim 4, wherein the height of the cutter teeth is larger than the height of the feeding hole.

6. The food cutter according to claim 4, wherein a push-pull groove is formed in the inner wall of the mounting cavity and matched with the cutter teeth.

7. The food cutter according to claim 1, wherein clearance grooves are formed in the side walls of the operating frame; a knife handle is arranged on the movable knife; and the clearance grooves are matched with the knife handle.

8. The food cutter according to claim 1, wherein the elastic connecting piece is a tension spring.

9. The food cutter according to claim 1, further comprising a foot stand which is hinged with the operating frame.

* * * * *